(12) United States Patent
Brashears

(10) Patent No.: US 6,645,275 B2
(45) Date of Patent: Nov. 11, 2003

(54) APPARATUS AND METHODS FOR REMOVING FINES FROM A GAS STREAM

(75) Inventor: David F. Brashears, Orlando, FL (US)

(73) Assignee: Gencor Industries, Inc., Orlando, FL (US)

(*) Notice: Subject to any disclaimer, the term of this patent is extended or adjusted under 35 U.S.C. 154(b) by 69 days.

(21) Appl. No.: 09/905,890

(22) Filed: Jul. 17, 2001

(65) Prior Publication Data

US 2003/0015095 A1 Jan. 23, 2003

(51) Int. Cl.⁷ .................................................. B28C 5/46
(52) U.S. Cl. .............................. 95/286; 55/287; 55/356; 366/22; 366/25; 366/40; 366/62; 366/35; 366/38
(58) Field of Search .................... 55/287, 288, 289, 55/302, 356; 95/279, 280, 282, 286; 34/136, 137; 366/25, 62, 22, 40, 35, 38

(56) References Cited

U.S. PATENT DOCUMENTS

| | | | |
|---|---|---|---|
| 2,028,745 A | * 1/1936 | Hendrick et al. | 366/15 |
| 2,146,405 A | * 2/1939 | Overman | 366/22 |
| 4,211,490 A | * 7/1980 | Brock et al. | 366/25 |
| 4,298,287 A | * 11/1981 | McCarter, III et al. | 366/25 |
| 4,616,934 A | * 10/1986 | Brock | 366/25 |
| 4,715,720 A | * 12/1987 | Brock | 366/25 |
| 5,095,607 A | 3/1992 | Simon et al. | |
| 5,193,291 A | 3/1993 | Brashears | |
| 5,305,533 A | * 4/1994 | Alexander et al. | 34/549 |
| 5,433,520 A | * 7/1995 | Adams et al. | 366/35 |
| 5,542,544 A | * 8/1996 | Merkle et al. | 209/139.1 |
| 5,549,734 A | * 8/1996 | Standard | 95/279 |
| 5,620,249 A | * 4/1997 | Musil | 366/25 |
| 5,738,022 A | * 4/1998 | Reilly | 110/165 R |
| 5,783,142 A | * 7/1998 | Lindsay | 266/145 |
| 5,795,060 A | * 8/1998 | Stephens | 366/2 |
| 5,873,919 A | * 2/1999 | Vross et al. | 55/356 |
| 5,887,797 A | 3/1999 | Elliott | |
| 5,967,655 A | * 10/1999 | Hills | 366/35 |
| 6,022,389 A | * 2/2000 | Vross et al. | 55/356 |
| 6,248,156 B1 | * 6/2001 | Lucas | 95/218 |
| 6,270,732 B1 | * 8/2001 | Gardner et al. | 55/300 |

* cited by examiner

Primary Examiner—Blaine Copenheaver
Assistant Examiner—Minh-Chau T. Pham
(74) Attorney, Agent, or Firm—Nixon & Vanderhye

(57) ABSTRACT

A bag house is mounted on a portable trailer and has a tube sheet with depending filter bags in part defining a first plenum for receiving a gas stream with fines and a second plenum for receiving clean gas from the filter bags. The fines are collected in one or more hoppers below the filter bags. A screw conveyor in each hopper has reverse flighting adjacent opposite ends for conveying separated fines longitudinally along and from adjacent opposite ends toward a central location intermediate the length of the housing. An elevation conveyor having an inlet located in the central location conveys the collected separated fines out of the housing to an external outlet for discharge into a surge operator.

25 Claims, 4 Drawing Sheets

APPARATUS AND METHODS FOR REMOVING FINES FROM A GAS STREAM

BACKGROUND OF THE INVENTION

The present invention relates to a fines removal system for bag houses and particularly relates to bag houses and methods of operating the bag houses for use in forming a hot mix asphalt.

In making hot mix asphalt, there is a mix design for each asphaltic product to be produced. The mix designer, through laboratory, work and guidelines established by governmental authorities, develops the hot mix asphalt mix design to arrive at the most economical and highest performance pavement. In the development of the mix design, the designer specifies the proper amounts of each size aggregate including fines along with the proper amount of asphalt cement to make the ideal mix design for a particular application. In drum mix or continuous mix plants where the aggregates are dried and processed on a continuous basis and mixed with the asphalt cement, it is critical to control the proportions of these materials on a real time basis so that a proper, consistent mix is obtained.

Because of the variation in the transit time through the system for each material, the control system must compensate so that at the final mixing point, all of the materials are delivered in the proper proportions. Causes for the variation in time may be due to the distance each material must travel, since some feed bins are located farther from the mixing point than others. Additionally, aggregates of different sizes move through the drum at different speeds due to the action of the flighting and the flow of burner gases around the aggregates.

In the case of the very fine materials known as fines, filler or dust in the industry, these materials become substantially airborne and leave the dryer unit with the exhaust gases. In this way, they are separated from the balance of the aggregates which continue to progress through the drum to the mixing zone (if a drum mixer or continuous mix unit). These fines are later captured in the exhaust system by the primary collector (if utilized since not all systems have primary collectors) or by the secondary collector which is most often a bag house. The fines going to the bag house are collected on the surface of the filtering media (bags) and remain there until the bag is cleaned.

In state-of-the-art bag houses, the fines are cleaned from the bags while the unit is being operated. The two most popular bag cleaning methods is by pulse jet or reverse air cleaning, although other methods such as sonic or shaker can be utilized. When a bag house is cleaned while the balance of the plant is still in operation, it is necessary to only clean a portion of the bag house at any one time, since if all areas were cleaned at one time, it would temporarily halt the normal operation of the bag house and interrupt the operation of the entire plant. In addition, if all of the bag house was cleaned at one time, there would be no fines discharge during periods of no cleaning followed by a huge surge of fines immediately after commencement of the cleaning cycle. Since in the drum mix or continuous mix process the fines are ideally fed back to the process at a constant rate, these extreme variations in fines flow are unacceptable.

By only cleaning a small portion of the bag house at a time, continuous operation of the plant can be maintained. In a pulse jet bag house, this is accomplished by cleaning a limited number of rows of bags at a given time. In the case of a reverse air bag house, in a like manner, only one section is cleaned at a time. Despite only cleaning portions of the bag house at a time, surging, however, can still occur.

In processes like drum mix or continuous mix asphalt production, it is necessary to return the dust to the mixer at a rate and proportion which is correct at all times for the mix design. This presents a challenge since the flow of fines from the bag house can vary depending on (i) which section of the bag house is being cleaned at a given time, (ii) the sequence of cleaning and (iii) the speed of extraction from the collection hoppers by the hopper conveyor screws or drag. As a result, it is not uncommon for surges in fines to occur at the discharge followed by periods of low or no flow of fines.

In order to solve or minimize this problem, designers have typically added additional equipment to smooth out these surges. One of the most common systems is known as the "Indiana Fines System" since it was first utilized in Indiana. In this system, which is also depicted in FIG. 1 hereof, the fines are removed continuously (including surges if present) from one end of the bag house 10 by an elevating screw conveyor 11 and deposited into a large enclosed surge hopper or bin 12. On the surge hopper, there is a high level and a low level detector, not shown, used by the operator to monitor the level of fines in the hopper. On the bottom outlet of the hopper is a variable speed, rotary air lock transfer valve 14. To obtain proper performance, the operator will set the speed of the rotary valve for a given production rate and mix design at a speed, as required, to maintain the level of the fines in the hopper 12 between the high and low level points. In this way, the operator can allow for some surging from the bag house, but will maintain nearly a constant flow rate return of fines to the process. As illustrated, the screw conveyor 11 also can carry the fines beyond the hopper if it is full to a waste discharge port 16. This is not a normal condition, but is provided in case the operator fails to remove the fines from the hopper fast enough.

In FIG. 1, it will be appreciated that the dust which is cleaned from the bags at the gas inlet end 18 of the bag house has a shorter transit time to flow to the discharge screw than fines which would be cleaned from the bags at the opposite end of the bag house. This, along with the actual timing of the cleaning cycle, causes the surging of the fines at the discharge. It will also be appreciated that the "Indiana fines system" adds considerable equipment and length to the bag house. In a particular case, it increased the overall trailer length by over twelve feet. Because of this increase in length, structural changes must be made to the bag house also.

In other systems, the designers remove 100% of the dust from the bag house and transport it to a large mineral filler (fines) silo. In doing this, the fines pass through a mass flow meter to measure the amount of fines that are being removed from the bag house on a real time basis. In the plant process controls, this quantity of fines is then subtracted from the total mass of material being processed. On the outlet of the mineral filer silo, there is then equipped an additional metering device which can both control the extraction rate of fines from the silo and measure the amount of fines being extracted. The plant process controls calculates the amount of fines required as dictated by the mix design, and then controls the extraction and returns to process rate to match the required amount. This type of system is expensive to implement, difficult to calibrate, and difficult to maintain.

BRIEF SUMMARY OF THE INVENTION

In accordance with a preferred embodiment of the present invention, there is provided an elongated housing carrying a separator, preferably a plurality of bags depending from a tube sheet, defining plenums on opposite sides of the bags and tube sheet for containing a gas stream with fines and a clean gas stream, respectively. One or more elongated fines collection hoppers extend longitudinally within the housing for receiving the separated fines. A longitudinally extending collection conveyor, preferably a screw conveyor, conveys the separated fines from adjacent opposite ends of the hopper and in opposite longitudinal directions to a location intermediate, preferably centrally of, the collection hopper. A surge hopper for receiving the fines is mounted externally and at one end of the housing. An elevating conveyor extends longitudinally into the housing and has an inlet adjacent said intermediate location for receiving the separated fines from the longitudinally extending collection conveyor and conveying the separated fines to an outlet for discharge into the surge hopper. The surge hopper has a rotating valve at a discharge outlet for combining the separated fines with the coarse fines previously separated from the gas stream for return to the processing plant, e.g., a drum mixer for making asphaltic material or to a silo for storing the fines.

In a particular preferred embodiment of the present invention, a pair of longitudinally extending hoppers are provided in parallel side-by-side relation for receiving the fines separated from the gas stream. In each hopper, there is provided a screw conveyor having reverse flighting for conveying the separated fines from opposite ends of the separator in opposite directions toward the intermediate location. The elevating conveyor comprises a screw conveyor for transporting the fines from the intermediate location to the discharge hopper.

As a consequence of the foregoing construction, the fines are collected from a central point in the bag house which minimizes the variations in transit time of the fines to the discharge location intermediate the opposite ends of the housing. This, in turn, reduces the tendency of the fines to surge. Additionally, the bag house is preferably mounted on wheels and is therefore portable. By locating the inlet to the elevating screw conveyor centrally of the housing, a shortening of the overall length of the bag house trailer is provided with resulting cost savings and affording a more compact system.

In a preferred embodiment according to the present invention, there is provided a bag house for removing fines from a gas stream, comprising an elongated housing, a separator within the housing for separating fines from the gas stream, at least one fines collection hopper within the housing and extending longitudinally of the housing for receiving the separated fines, a longitudinally extending collection conveyor for conveying the separated fines from adjacent opposite ends of the hopper and in opposite longitudinal directions along the hopper to a location intermediate the opposite ends of the hopper and a longitudinally extending elevating conveyor having an inlet adjacent the intermediate location for receiving the separated fines from the longitudinal extending collection conveyor and conveying the separated fines to an outlet for discharge from the housing.

In a further preferred embodiment according to the present invention, there is provided a method of removing fines from a gas stream containing fines and supplied to a bag house, comprising the steps of (a) providing an elongated housing having a separator for separating the fines from the gas stream and an elongated hopper within the housing for collecting the separated fines, (b) conveying the separated fines from adjacent opposite ends of the hopper and in opposite longitudinal directions along the hopper to a location intermediate the opposite ends of the hopper, (c) conveying the separated fines from the intermediate location to a location external to one end of the housing and (d) discharging the separated fines adjacent one end of the housing into a discharge hopper.

DETAILED DESCRIPTION OF THE INVENTION

Figure 1:
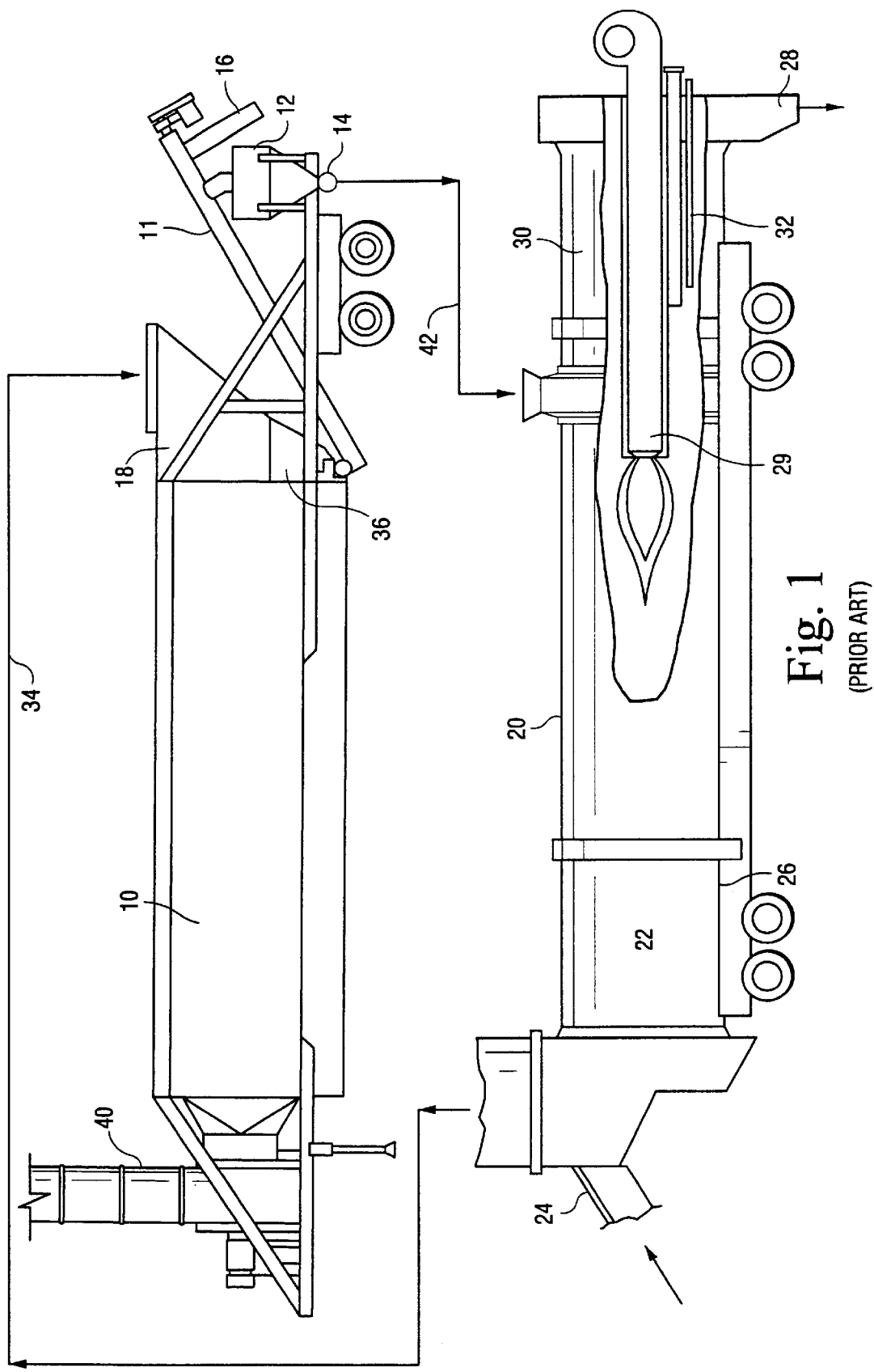
FIG. 1 is a schematic illustration of an asphalt plant having a drum mixer and a bag house for forming an asphaltic product according to the prior art.

Referring now to FIG. 1, and as previously noted, there is provided a bag house 10 for separating fines from a gas stream supplied from the exhaust of a drum mixer 20. The drum mixer includes a mixing section 22 wherein aggregate is supplied through an inlet 24 for reception in the inclined rotating drum 26 of the mixer 20. A burner head 28 extends into the rotating drum mixer and supplies heated gases for drying the aggregate in the drying section 22 as the aggregate flows from the inlet 24 to a discharge 28. Downstream of the burner head 28 is a mixing section 30 where the dried aggregate is mixed with a cementitious material supplied by a pipeline 32 to provide an asphaltic mix at discharge 28. The hot gas stream exhausting from the drum mixer 20 and containing both coarse and fines materials from the aggregate passes into the bag house 20 via a conduit 34.

Within the inlet 18 of the bag house, there is provided a slanted wall which, in conjunction with a reversal of the direction of flow of the gas stream, enables separation of the coarse materials from the fines. The coarse materials are deposited in a hopper 36 for return, by means not shown, to the drum mixer. The fines, however, pass with the gas stream into the bag house 10. It will be appreciated that the bag house 10 may be any one of a plurality of different types of bag houses. In one type, a tube sheet extends substantially the entire longitudinal length of the housing and from which tube sheet hangs a plurality of filter bags. First and second plenums lie on opposite sides of the tube sheet. The gas stream with fines is supplied to the first plenum below the tube sheet and the fines are deposited on the external surfaces of the hanging bags. The gas proceeds through the bags and openings in the tube sheet and flows through the second plenum to an exhaust 40. The fines deposited on the external surface of the filter bags drop into a hopper extending the length of the housing and containing a conveyor for conveying the separated fines to the inlet or lower end of the elevating conveyor 11. The elevating conveyor conveys the fines for discharge into a surge hopper 12. A rotary valve 14 at the bottom of the surge hopper 12 may return the fines via conduit 42 for mixing with the aggregate and cementitious material in the mixer section 30 of the drum mixer or providing the fines to a separate silo.

From a review of FIG. 1, it will be appreciated that there is significant difference in the time required for transport of the fines collected adjacent one end of the housing and those collected adjacent the opposite end. This leads to surges in the fines which adversely affect the proportions of materials in the final mix. Additionally, when the bag house filters are cleaned, they are cleaned in sections which, when cleaned during plant operation, as desirable, produces surges or no fines and hence extreme variations in fines flow. The present invention minimizes or eliminates the surges in the fines flows and provides for a near constant flow of fines.

Figure 2:
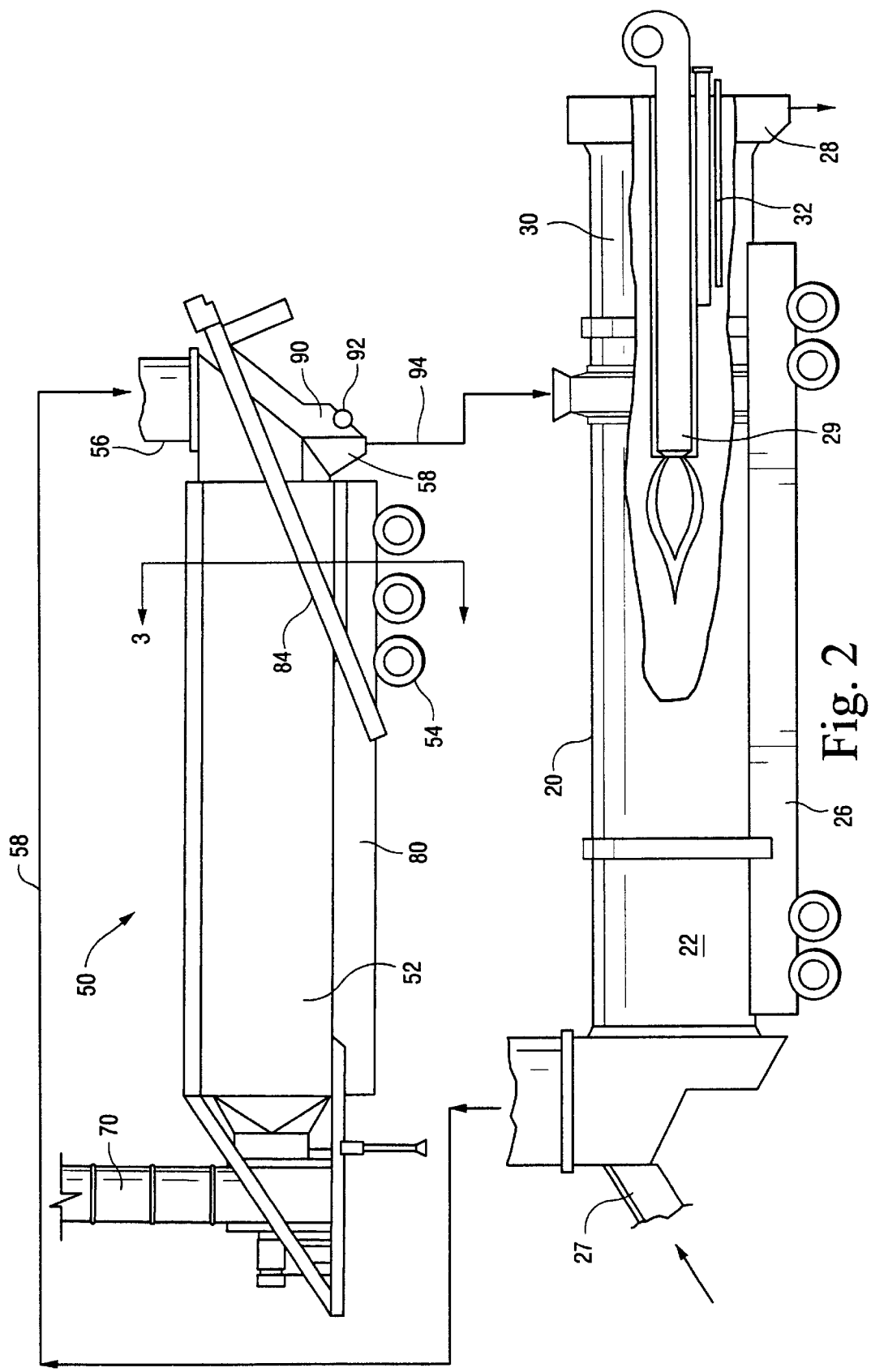
FIG. 2 is a schematic illustration of a bag house in combination with a drum mixer in accordance with a preferred embodiment of the present invention.
Figure 3:
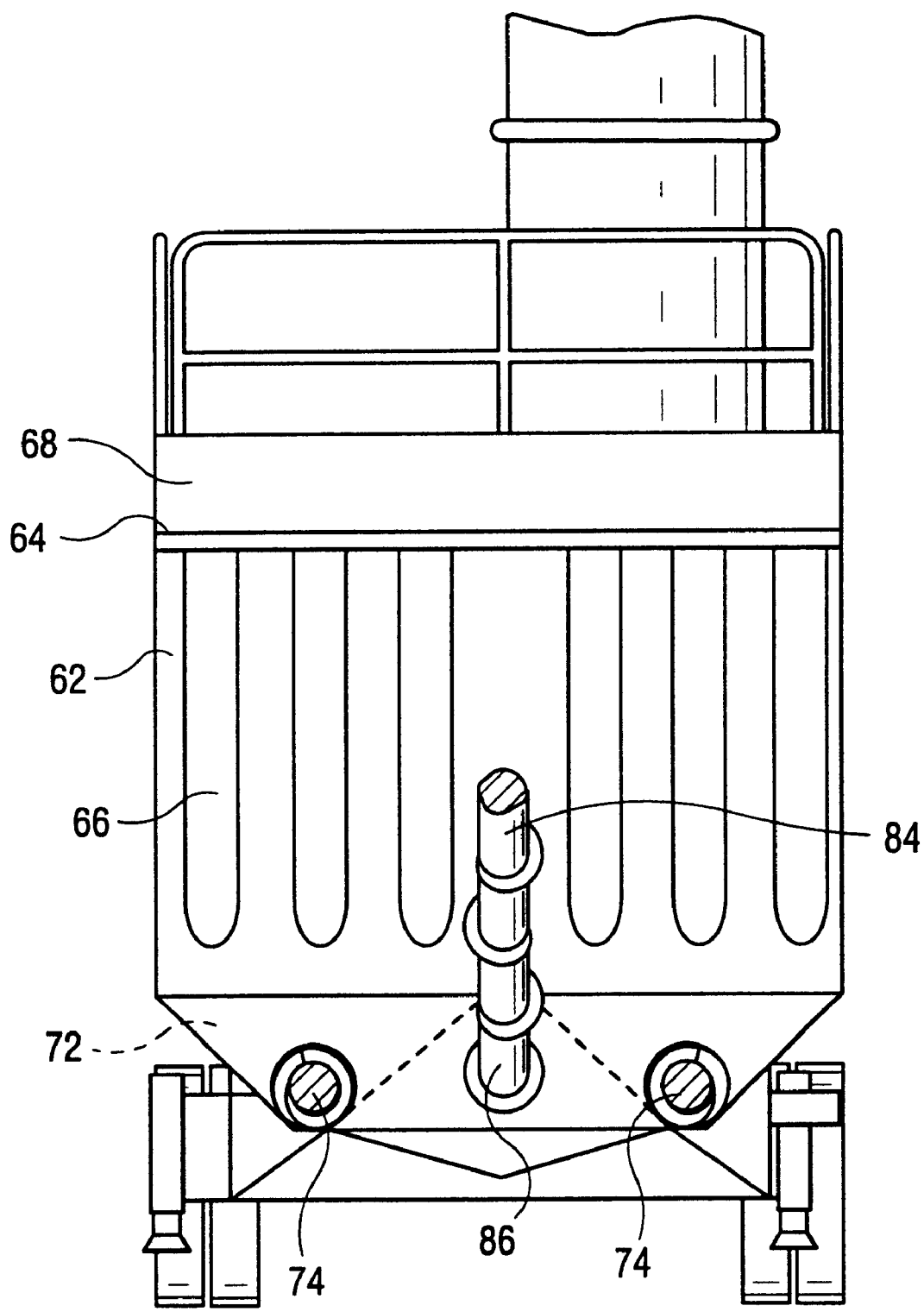
FIG. 3 is a schematic cross-sectional view taken generally about on line 3—3 in FIG. 2.

A preferred embodiment of the present invention is illustrated in FIG. 2. The mixer illustrated in FIG. 2 is identical to the prior art drum mixer illustrated in FIG. 1 and bears like reference numerals. However, the bag house in accordance with the present invention is generally indicated at 50 and includes an elongated housing 52, preferably mounted on a trailer having wheels 54 whereby the bag house may be transportable together with the mixer, which is likewise transportable. The bag house 50 includes an inlet 56 for receiving the gas with fines via a conduit 58 from the exhaust of the drum mixer. The gas stream with both coarse materials and fines is initially separated in a conventional manner at the inlet end of the bag house 50, the coarse fines being separated from the gas stream for discharge via a primary collector 58. The gas stream with fines flows into the bag house 50 and into a plenum 62 (FIG. 3) lying below a tube sheet 64. The tube sheet extends substantially the length of the housing 52 and has a plurality of openings to which are attached depending bag filters 66. The filters are closed at their lower ends and open at their upper ends. Thus, the gas stream with fines flows into the first plenum 62 where the fines are collected on the external sides of the filter bag 66. The gas passes through the filter bag 66 and upwardly through the openings in the tube sheet for flow in a second plenum to an exhaust stack 70.

In a preferred embodiment of the present invention, the separated fines fall from the filter bags into one or more longitudinally extending hoppers 72. The hoppers 72 extend the length of the separator and thus collect the separated fines throughout the entire length of the housing. It will be appreciated that the bag house is cleaned in sections during its operation. While various types of cleaning operations may be provided, one particularly effective cleaning operation requires the interior of the bag house and particularly plenum 62 to be at a low pressure. To clean the bags, the clean gas plenum 68 is open to atmosphere. With the exhaust closed off, the fresh air aspirated into the second plenum at atmospheric pressure inflates the bags in the section undergoing cleaning causing the dust to drop from the bags into the underlying hopper. Each of the hoppers 72 includes a longitudinally extending conveyor, preferably a screw conveyor 74. It will be appreciated that the screw conveyor 74 extends substantially the longitudinal extent of the separator and transports the separated fines toward a central location within the housing.

Figure 4:
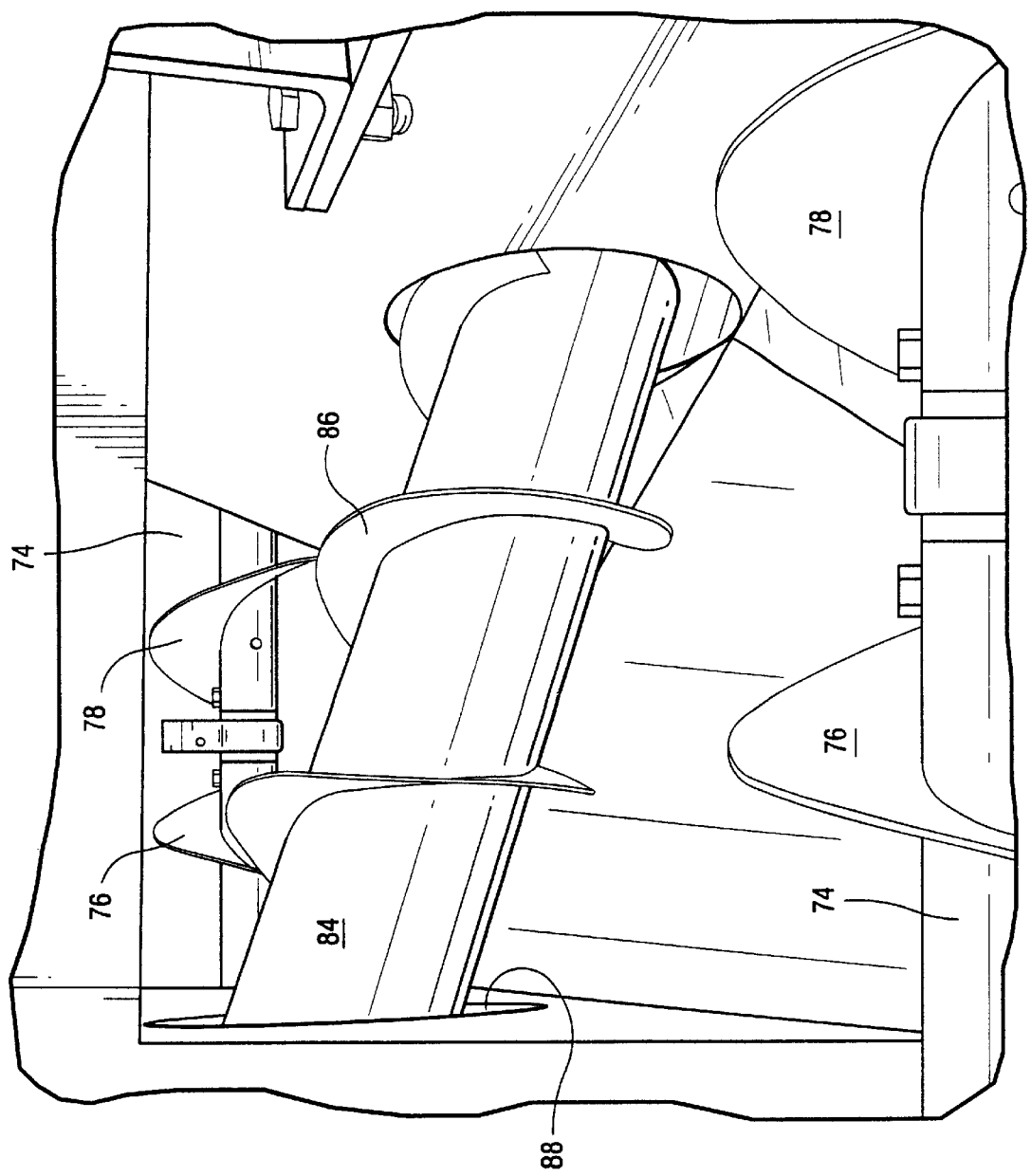
FIG. 4 is an enlarged perspective view of a pair of collection hoppers, longitudinally extending screw conveyors and an inclined elevating conveyor forming part of the bag house of FIGS. 2 and 3.

In accordance with the present invention, the screw conveyors 74 have reverse flighting 76 and 78 (FIG. 4). Consequently, the separated fines collected adjacent one end of one hopper 72 are displaced toward a central location 80 (FIG. 2), while the separated fines in the hopper 72 adjacent the opposite end are likewise transported in an opposite direction toward the central location 80 by reversed flighting. The central location may comprise a space, container or bin in which the fines are accumulated for subsequent removal from the bag house and is preferably located in the middle 20% of the length of the bag house. In a preferred form, a pair of screw conveyors 74 lie on opposite sides of the housing and extend longitudinally such that the separated fines flow in opposite directions from adjacent opposite ends of the housing toward the central location 80. It will be appreciated that the transit time for the fines delivered to the central location from opposite ends of the housing is substantially the same. Also, if one of the sections of the bag house is shut down for cleaning, it will be appreciated that separated fines continue to flow toward the central location, albeit at a reduced flow rate along one end of the screw conveyor 74, while the full flow of separated fines is delivered to the central location by the opposite end of the screw conveyor.

To remove the fines from the central location, the hoppers 72 lie in communication with one another at the central location 80. An elevating conveyor 84 is mounted in bearings in the housing and has an inlet 86 at the central location 80. The conveyor 84 is preferably a screw conveyor with the flights 86 (FIG. 4) extending into a tubular opening 88 for transporting the separated fines from the central location 80 to a discharge hopper 90. A rotary valve 92 is provided at the bottom of the discharge hopper 90 for selectively discharging the separated fines into a coarse materials hopper 58 for flow via conduit 94 to the drum mixer. Alternatively, the valve may be closed to the primary collector 58 and the fines discharged to a silo, for example, by another screw conveyor, not shown. By locating the inlet to the elevation conveyor at the central location, the surge in the flow of fines, for example, to the mixer, is minimized because of the near-constant steady flow rate of fines provided the discharge hopper. Even when sections of the bag house are cleaned, the flow rate is not significantly altered sufficiently to change the mix beyond desired proportions within limits. Even when changing mixes, there is significantly less surge. Importantly also is that the longitudinally inclined elevating conveyor considerably shortens the length of the trailer, in comparison with the prior art bag house illustrated in FIG. 1, and has improved performance and significant cost reductions.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A bag house for removing fines from a gas stream, comprising:

an elongated housing;

a separator within the housing for separating fines from the gas stream, said separator including a fines filter separating first and second plenums one from the other respectively in part defining the gas stream with fines and a clean gas stream without fines on opposite sides of the filter;

at least one fines collection hopper within said housing and extending longitudinally of said housing, said first plenum and said fines collection hopper lying in communication with one another enabling the fines collection hopper to receive the separated fines;

a longitudinally extending collection conveyor for conveying the separated fines from adjacent opposite ends of said hopper and in opposite longitudinal directions along the hopper to a location intermediate the opposite ends of the hopper; and a longitudinally extending inclined elevating conveyor having an inlet within said housing adjacent said intermediate location for receiving the separated fines from the longitudinal extending collection conveyor and conveying the separated fines to an outlet elevated above said inlet for discharge from the housing.

2. A bag house according to claim 1 including a surge hopper located adjacent one end of said separator and externally of said housing, said elevating conveyor outlet being located externally of said housing.

3. A bag house according to claim 1 wherein said collection and elevating conveyors comprise screw conveyors.

4. A bag house according to claim 3 wherein said one collection conveyor has reverse flighting on respective opposite sides of said intermediate location for flowing the fines to said intermediate location.

5. A bag house according to claim 1 wherein said intermediate location lies generally centrally of said housing.

6. A bag house according to claim 1 wherein said housing is portable and mounted on wheels for transport to a site.

7. A bag house according to claim 1 including a second fines collection hopper within said housing and extending longitudinally of said housing for receiving the separated fines from said first plenum, said one collection hopper and said second collection hopper being transversely spaced from one another and extending generally parallel to one another, a second longitudinally extending collection conveyor for conveying the separated fines from adjacent opposite ends of said second hopper and in opposite longitudinal directions therealong to said intermediate location, said inlet of said elevating conveyor being disposed laterally between said one collection conveyor and said second collection conveyor, said elevating conveyor extending centrally of said housing from said inlet to an outlet external to said housing.

8. A bag house according to claim 7 wherein said collection and elevating conveyors comprise screw conveyors, each of said collecting conveyors having reverse flighting on respective opposite sides of said intermediate location for flowing the fines to said intermediate location.

9. A bag house according to claim 1 in combination with a drum mixer, said mixer having an aggregate drying section and a mixing section for mixing dried aggregate and cementitious material with one another to form an asphaltic product, a burner forming part of said mixer for supplying heated gas in said dryer section for drying the aggregate, said bag house having an inlet for directing gas with fines contained therein from the drying section to said separator and a conduit for conveying the separated fines from the outlet of the elevating conveyor to the mixing section of the drum.

10. A method of removing fines from a gas stream containing fines and supplied to a bag house, comprising the steps of:

(a) providing an elongated housing having a separator within the housing having first and second plenums on opposite sides of a fines filter for separating the fines from the gas stream and providing an elongated hopper within the housing for collecting the separated fines received from said first plenum;

(b) conveying the separated fines from adjacent opposite ends of said hopper and in opposite longitudinal directions along the hopper to a location intermediate the opposite ends of the hopper;

(c) conveying the separated fines from said intermediate location to a location external to one end of the housing, the step of conveying including providing an elevating conveyor having an inlet within said housing at said intermediate location for conveying the separated fines to an elevated location external to said housing having an outlet for discharging the separated fines into the discharge hopper; and (d) discharging the separated fines adjacent said one end of the housing into a discharge hopper.

11. A method according to claim 10 wherein step (b) includes providing a screw conveyor having reverse flights for conveying the separated fines in opposite directions to said intermediate location.

12. A method according to claim 10 including mounting the housing on wheels for transport.

13. A method according to claim 10 including porviding a second elongated hopper within the housing extending generally parallel to the first mentioned elongated hopper for collecting the separated fines, conveying the separated fines from adjacent opposite ends of said second hopper and in opposite longitudinal directions along the second hopper to said intermediate location for conveyance to the external location.

14. A bag house for removing fines from a gas stream, comprising:

an elongated housing;

an elongated separator within the housing for separating fines from the gas stream, said separator including a fines filter separating first and second plenums one from the other respectively in part defining the gas stream with fines and a clean gas stream without fines on opposite sides of the filter;

at least one fines collection hopper within said housing and extending generally coextensively with the separator within the housing, said first plenum and said fines collection hopper lying in communication with one another enabling the fines collection hopper to receive the separated fines;

a collection conveyor for conveying the separated fines from adjacent opposite ends of said hopper and in opposite directions along the hopper to a location intermediate the opposite ends of the hopper; and a fines removal conveyor within said housing having an inlet adjacent said intermediate location for receiving the separated fines from the collection conveyor and conveying the separated fines to an outlet external to said housing for discharge from the housing, said fines removal conveyor extending in an upwardly inclined direction from said inlet to said outlet.

15. A bag house according to claim 14 wherein said collection conveyor has reverse flighting on respective opposite sides of said intermediate location for flowing the fines to said intermediate location.

16. A bag house according to claim 14 wherein said intermediate location lies generally centrally of said housing.

17. A bag house according to claim 1 wherein said housing is portable and mounted on wheels for transport to a site.

18. A bag house according to claim 14 including a second fines collection hopper within said housing and extending generally coextensively with the separator within the housing for receiving the separated fines from said first plenum, said one collection hopper and said second collection hopper being transversely spaced from one another and extending generally parallel to one another, a second collection conveyor for conveying the separated fines from adjacent opposite ends of said second hopper and in opposite directions therealong to said intermediate location, said inlet of said fines removal conveyor being disposed laterally between said one collection conveyor and said second collection conveyor.

19. A bag house according to claim 18 wherein said collection and fines removal conveyors comprise screw conveyors, each of said collecting conveyors having reverse flighting on respective opposite sides of said intermediate location for flowing the fines to said intermediate location.

20. A method of removing fines from a gas stream containing fines and supplied to a bag house, comprising the steps of:
(a) providing an elongated housing having a separator within the housing having first and second plenums on opposite sides of a fines filter for separating the fines from the gas stream and providing an elongated hopper within the housing in communication with said first plenum for receiving and collecting the separated fines;
(b) conveying the separated fines from adjacent opposite ends of said hopper and in opposite directions along the hopper to a location intermediate the opposite ends of the hopper;
(c) conveying the separated fines from said intermediate location to a location external to the housing, the step of conveying including providing an elevating conveyor having an inlet within said housing at said intermediate location for conveying the separated fines to an elevated location external to said housing having an outlet for discharging the separated fines into the discharge hopper; and
(d) discharging the separated fines from said location external to the housing into a discharge hopper.

21. A method according to claim 20 wherein step (b) includes providing a screw conveyor having reverse flights for conveying the separated fines in opposite directions to said intermediate location.

22. A method according to claim 20 including mounting the housing on wheels for transport.

23. A method according to claim 20 including providing a second elongated hopper within the housing extending generally parallel to the first mentioned elongated hopper and in communication with said plenum for receiving and collecting the separated fines, conveying the separated fines from adjacent opposite ends of said second hopper and in opposite directions along the second hopper to said intermediate location for conveyance to the external location.

24. A baghouse according to claim 14 wherein the outlet for the fines removal conveyor is elevated above the inlet adjacent the intermediate location.

25. A method according to claim 20 wherein step (c) includes conveying the separated fines from the intermediate location in a direction inclined upwardly to a location external to the housing.

* * * * *